(12) United States Patent
Machii et al.

(10) Patent No.: US 8,765,308 B2
(45) Date of Patent: Jul. 1, 2014

(54) POROUS MEMBRANE AND PROCESS FOR PREPARING THE SAME

(71) Applicant: Tokushu Tokai Paper Co., Ltd., Shimada (JP)

(72) Inventors: Yoshiharu Machii, Shizuoka (JP); Satoshi Nemoto, Shizuoka (JP); Yohta Mori, Shizuoka (JP)

(73) Assignee: Tokushu Tokai Paper Co., Ltd., Shimada-Shi, Shizuoka (JP)

( * ) Notice: Subject to any disclaimer, the term of this patent is extended or adjusted under 35 U.S.C. 154(b) by 0 days.

(21) Appl. No.: 13/978,352

(22) PCT Filed: Oct. 12, 2012

(86) PCT No.: PCT/JP2012/076456
§ 371 (c)(1),
(2), (4) Date: Jul. 3, 2013

(87) PCT Pub. No.: WO2013/054889
PCT Pub. Date: Apr. 18, 2013

(65) Prior Publication Data
US 2013/0280616 A1    Oct. 24, 2013

(30) Foreign Application Priority Data
Oct. 13, 2011   (JP) ................................. 2011-226272

(51) Int. Cl.
*H01M 2/16*    (2006.01)
(52) U.S. Cl.
USPC ......................................................... 429/249
(58) Field of Classification Search
None
See application file for complete search history.

(56) References Cited

U.S. PATENT DOCUMENTS

| 4,594,287 A | 6/1986 | Hucke | |
| 5,607,695 A * | 3/1997 | Ek et al. | 424/468 |

(Continued)

FOREIGN PATENT DOCUMENTS

| EP | 1769836 | 4/2007 |
| JP | 62-061269 A | 3/1987 |

(Continued)

OTHER PUBLICATIONS

Guo et al., Surface area and porosity of acid hydrolyzed cellulose nanowhiskers and cellulose produced by Gluconacetobacter xylinus, Carbohydrate Polymers 87 (2012) 1026-1037, Available online Aug. 10, 2011.*

(Continued)

*Primary Examiner* — Patrick Ryan
*Assistant Examiner* — Jose Colucci Rios
(74) *Attorney, Agent, or Firm* — Lucas & Mercanti, LLP; Robert P. Michal (57) ABSTRACT

The present invention relates to a porous membrane containing cellulose fibers, wherein the cellulose fibers contain 5% by weight or more of cellulose fibers with a diameter of 1 μm or more, relative to the total weight of the cellulose fibers, the mode diameter (maximal frequency) of the pore distribution determined by the mercury penetration method is less than 0.3 μm, the air resistance per thickness of 10 μm is from 20 to 600 seconds, and the porous membrane has a volume resistivity of 1500 Ω·cm or less determined by alternate current with a frequency of 20 kHz in which the porous membrane is impregnated with 1 mol/LiPF$_6$/propylene carbonate solution. The porous membrane according to the present invention can provide a separator for electrochemical devices with superior properties at a reasonable cost.

14 Claims, 2 Drawing Sheets

(56) References Cited

U.S. PATENT DOCUMENTS

| | | | |
|---|---|---|---|
| 5,954,962 | A | 9/1999 | Adiletta |
| 7,170,739 | B1 | 1/2007 | Arora et al. |
| 2005/0053840 | A1* | 3/2005 | Jo et al. ............... 429/247 |
| 2007/0207692 | A1* | 9/2007 | Ono et al. ............. 442/327 |
| 2009/0324710 | A1* | 12/2009 | Glidden et al. ........ 424/451 |
| 2010/0272980 | A1* | 10/2010 | Kowata et al. ........ 428/220 |
| 2011/0236763 | A1* | 9/2011 | Noda et al. ............ 429/248 |
| 2012/0214044 | A1 | 8/2012 | Takami et al. |
| 2013/0017432 | A1 | 1/2013 | Roumi |
| 2013/0078525 | A1 | 3/2013 | Morin et al. |
| 2013/0251890 | A1 | 9/2013 | Lee et al. |

FOREIGN PATENT DOCUMENTS

| | | |
|---|---|---|
| JP | 10-256088 A | 9/1998 |
| JP | 11-040130 A | 2/1999 |
| JP | 11-238497 A | 8/1999 |
| JP | 2000-073265 A | 3/2000 |
| JP | 2000-331663 A | 11/2000 |
| JP | 2004-146346 A | 5/2004 |
| JP | 2005-539129 A | 12/2005 |
| JP | 2006-049797 A | 2/2006 |
| JP | 2006-193858 A | 7/2006 |
| JP | 2007-073382 A | 3/2007 |
| JP | 2008-274525 A | 11/2008 |
| JP | 4201308 B2 | 12/2008 |
| JP | 2009-081048 A | 4/2009 |
| JP | 2009-158811 A | 7/2009 |
| JP | 2009-224100 A | 10/2009 |
| JP | 4425576 B2 | 3/2010 |
| JP | 2010-090486 A | 4/2010 |
| JP | 2010-202987 A | 9/2010 |
| JP | 2010-235802 A | 10/2010 |
| JP | 4628764 B2 | 2/2011 |
| KR | 101040572 | 6/2011 |
| WO | WO 2004/027897 A1 | 4/2004 |
| WO | WO 2005/101432 A1 | 10/2005 |
| WO | 2006-035614 A1 | 4/2006 |
| WO | 2010/134868 | 11/2010 |

OTHER PUBLICATIONS

Kuribayashi, Characterization of composite cellulosic separators for rechargeable lithium-ion batteries, Journal of Power Sources 63 (1996) 87-91.*

Yin et al., Porous bacterial cellulose prepared by a facile surfactant-assisted foaming method in azodicarbonamide-NaOH aqueous solution, Materials Letters 81 (2012) 131-134, Available online May 5, 2012.*

Masanori Imai et al., specification, claims, abstract and the drawings of the unpublished co-pending U.S. Appl. No. 13/977,212, filed Jun. 28, 2013.

Masanori Imai et al., specification, claims, abstract and the drawings of the unpublished co-pending U.S. Appl. No. 13/977,322, filed Jun. 28, 2013.

Satoshi Nemoto et al., specification, claims, abstract and the drawings of the unpublished co-pending U.S. Appl. No. 13/978,336, filed Jul. 3, 2013.

Masanori Imai et al., specification, claims, abstract and the drawings of the unpublished co-pending U.S. Appl. No. 13/978,342, filed Jul. 3, 2013.

H. Ougiya et al; Relationship Between the Physical Properties and Surface Area of Cellulose Derived From Adsorbates of Various Molecular Sizes; Biosci, Biotechnology Biochem, No. 62 (10); pp. 1880-1884; 1998.

PCT International Search Report of PCT International Application No. PCT/JP2012/076454, filed Oct. 12, 2012, mailed Dec. 18, 2012. (4 pages).

PCT International Search Report of PCT International Application No. PCT/JP2012/076447, filed Oct. 12, 2012, mailed Jan. 15, 2013. (4 pages).

PCT International Search Report of PCT International Application No. PCT/JP2012/076483, filed Oct. 12, 2012, mailed Jan. 15, 2013. (4 pages).

PCT International Search Report of PCT International Application No. PCT/JP2012/076428, filed Oct. 12, 2012, mailed Feb. 5, 2013. (4 pages).

PCT International Search Report of PCT International Application No. PCT/JP2012/076456, filed Oct. 12, 2012, mailed Jan. 15, 2013. (4 pages).

Marielle Henriksson et al: Cellulose nanopaper structures of high toughness, Biomacromolecules, American Chemical Society, US, vol. 9, No. 6 May 23, 2008, pp. 1579-1585, XP008157558.

OA1: Search Report; EP Application No. 12839853.4 mailed Aug. 30, 2013.

OA2: Search Report; EP Application No. 12839481.4 mailed Aug. 30, 2013.

OA3: Search Report; EP Application No. 12839576.1 mailed Sep. 10, 2013.

OA4: Search Report; EP Application No. 12839513.4 mailed Sep. 11, 2013.

Office Action issued Sep. 20, 2013 by the U.S. Patent Office in a related U.S. Appl. No. 13/977,322 (14 pages).

Office Action issued Sep. 20, 2013 by the U.S. Patent Office in a related U.S. Appl. No. 13/978,342 (11 pages).

Wiman et al., Cellulose accessibility determines the rate of enzyme hydrolysis of steam-pretreated spruce, Bioresouce Technology 126 (2012) 208-215, Available online Sep. 3, 2012.

Ki et al., Nanofibrous membrane of wool keratose/silk fibroin blend for heavy metal ion adsorption, Journal of Membrane Science 302 (2007) 20-26, Available online Jun. 14, 2007.

Search Report issued Nov. 26, 2013 by the European Patent Office in related European Application No. 12840430.8 (9 pages).

Office Action issued Jan. 8, 2014 by the U.S. Patent Office in related U.S. Appl. No. 13/978,336 (15 pages).

Non-Final Office Action Dated Feb. 14, 2014, which was issued by the U.S. Patent and Trademark Office in related U.S. Appl. No. 13/977,212 (8 pages).

Japanese Office Action dated Mar. 18, 2014 issued by the Japanese Patent Office in Application No. JP 2013-528426 (6 pages).

* cited by examiner

POROUS MEMBRANE AND PROCESS FOR PREPARING THE SAME

CROSS REFERENCE TO RELATED APPLICATIONS

This application is a 371 national phase of PCT/JP2012/076456 filed on Oct. 12, 2012, which claims the benefit under 35 U.S.C. §119(a) and 37 CFR 1.55 of Japanese Patent Application No. 2011-226272 filed on Oct. 13, 2011, the entire disclosure of each of which is incorporated herein by reference in its entirety.

TECHNICAL FIELD

The present invention relates to a porous membrane and a process for preparing the same. In particular, the present invention relates to a porous membrane formed from cellulose suitable for a separator for an electrochemical device and a process for preparing the same.

In the specification of the present application, an electrochemical device means an electrochemical device equipped with a positive electrode, a negative electrode, and a separator. As examples thereof, mention may be made of, for example, various types of secondary batteries such as a lithium ion secondary battery and a polymer lithium battery; various types of capacitors such as an aluminum electrolytic capacitor, an electrical double-layered capacitor and a lithium ion capacitor; and the like.

BACKGROUND ART

Recently, use of electricity as a source of energy has increased for addressing environmental problems related to $CO_2$ reduction, depletion of fossil fuel resources and the like. Therefore, for example, electric vehicles utilizing secondary batteries are being actively developed in the automobile industry. In addition, secondary batteries are featured also in view of efficient use of natural energy such as solar or wind energy.

In general, lithium ion secondary batteries are used as the secondary batteries for driving electric vehicles, at present, in view of the relationship between power and energy density. On the other hand, various companies have focused on the development of next-generation batteries in view of increased energy density, output, safety and the like. The next-generation batteries are in the fields with high future growth in the market.

On the other hand, in secondary batteries other than lithium ion secondary batteries, primary batteries, capacitors (condensers) and the like, separators formed from paper, non-woven fabrics, porous films or the like are used. The performances required for the separators are, in general, short circuit protection between positive and negative electrodes, chemical stability with respect to electrolytic solutions, low inner resistivity and the like. The aforementioned requisite performances are universal ones required in separators regardless of types thereof, although they differ in degree in accordance with devices.

Separators of almost all lithium ion secondary batteries use porous membranes formed from a polymer organic compound such as polypropylene, polyethylene or the like. The aforementioned porous membranes possess some characteristics suitable for lithium ion secondary batteries. For example, the following characteristics can be mentioned.

(1) Chemical stability with respect to electrolytic solutions is exhibited, and no fatal failures occur by separators.

(2) Thickness of a separator can be freely designed, and for this reason, separators responding to various demands can be provided.

(3) The diameter of pores can be designed to be reduced, and for this reason, superior lithium shielding properties are exhibited, and short circuit caused by lithium dendrite hardly occurs.

(4) When thermal runaway of lithium ion secondary batteries occurs, the initial thermal runaway can be controlled by melting polypropylene or polyethylene and thereby narrowing pores.

However, conventional research for lithium ion secondary batteries cannot identify an underlying cause of an occurrence of thermal runaway. Various companies have studied and proposed a means for avoiding risks of thermal runaway of various materials used in secondary batteries by empirical tools, under present circumstances. Developments of materials suitable for vehicles having increased safety are considered by clarifying the principle of thermal runaway and establishing a common evaluation method thereof hereafter. Problems with respect to safety are expected to be overcome.

On the other hand, the second problem in secondary batteries for use in vehicles is cost. A separator is a material accounting for 20% of the battery cost, and further cost reduction is required under the present circumstances.

For example, in the field of rechargeable transportation units such as electric vehicles, and in the field of portable electronic terminals such as mobile phones, an electrical energy-storage device having an increased amount of storage electrical energy per unit volume is required in order to be operational for a long period of time even with a reduced volume. As an example of the aforementioned electrical energy-storage device, mention may be made of an electrical double-layered capacitor in which an electrolyte dissolved in an electrolytic solution is adsorbed by an electrode, and electrical energy is stored on the interface (electrical double layer) formed between the electrolyte and the electrode.

Main roles of separators in the electrical double-layered capacitors are short circuit protection of electrodes (separatability), non-blocking movement of ions in the electrolytic solution (low inner resistivity), and the like. However, the aforementioned porous membranes have high density, and for this reason, the inner resistivity tends to increase. On the other hand, it is known that non-woven fabrics are used as a separator of a capacitor, but there are problems in that when a fiber diameter is reduced or a fiber density is increased in order to maintain separatability, an inner resistivity increases. For this reason, development of a separator with a reduced inner resistivity is desirable.

There are two major processes for preparing polymer porous membranes of polypropylene, polyethylene or the like, namely a wet process and a dry process. The aforementioned preparation processes have respective characteristics. In the wet process, a plasticizer is added to a polymer such as polyethylene to form a film, subsequently, the film is biaxially drawn, the plasticizer is removed by cleaning with a solvent, and thereby, pores are provided. In this process, there are advantages in that pore size or film thickness can be superiorly adjusted, and response to various demands for all individual types of batteries can be carried out. On the other hand, there is a problem in that the preparation process is complicated, and for this reason, cost increases. In contrast, in the dry process, a polymer such as polyolefin is dissolved, the polymer is extruded on a film, the film with the polymer is subjected to annealing, the annealed film is drawn at a low temperature to form pores at the initial stage, and subsequently, drawing at a high temperature is carried out to form a porous product. In this process, there are advantages in that polymers having different melting points can be laminated, and the process is easy, and for this reason, the product can be produced at a reasonable cost. On the other hand, there is a problem in that sensitive adjustment of pores or thickness cannot be carried out.

A separator using non-woven fabrics formed from synthetic fibers, inorganic fibers or the like, other than the polymer porous films, has also been proposed. Conventional non-woven fabrics include dry types of non-woven fabrics and wet types of non-woven fabrics, and both of these have also been utilized as separators. It is believed that dry types of non-woven fabrics by which uniformity of fiber distribution cannot be obtained has a low effect of isolating electrodes, and for this reason, they cannot be used for lithium ion secondary batteries. On the other hand, wet types of non-woven fabrics have characteristics in that fiber distribution is uniform, as compared with dry types of non-woven fabrics. In addition, a higher porosity can be adjusted, as compared with porous films due to the characteristics of the preparation process, and for this reason, a sheet with reduced impedance can be produced. However, it is substantially difficult to use the dry types of non-woven fabrics in batteries using graphite negative electrodes which are widely applied to lithium ion secondary batteries at present. This is due to the characteristics of lithium ion secondary batteries which produce lithium dendrite at the negative electrode side. The aforementioned lithium dendrite has a property in which lithium dendrite is easily produced on the surface of a negative electrode which many lithium ions in a separator pass. For this reason, in non-woven fabrics in which roughness in a range with several dozen μm order is formed in the sheet itself, the parts at which lithium dendrite is easily formed are course. Therefore, shielding properties of controlling short circuit at the time of producing lithium dendrite may be reduced, as compared with a film type one.

In order to overcome the aforementioned problems, specifying a pore size to a specified range is carried out, as described in Patent Document 1 (Japanese Unexamined Patent Application, First Publication No. H11-040130). However, the pore size depends on a fiber diameter. For this reason, the fiber diameter needs to be reduced in order to control the pore size to a small size. In the present technology, it is difficult to produce fibers with a nano-order size at a reasonable cost. For this reason, even if synthetic fibers which are referred to as ultrafine fibers are used, it is substantially impossible to control the pore size to a size suitable for a lithium ion secondary battery. Therefore, lithium shielding properties cannot be improved.

In addition, a method for producing a non-woven fabric using an electrostatic spinning method as described in Patent Document 2 (Japanese Patent No. 4425576) is proposed. However, the aforementioned method may not be a realistic method, considering production efficiency and that it is substantially difficult to prepare a sheet having a thickness of several dozen micrometers in present production facilities.

On the other hand, many separators of cellulose type are proposed. For example, Patent Document 3 (Japanese Patent No. 4201308) describes that since the hydroxyl groups of cellulose are not electrochemically stable, an acetylation treatment is carried out, and thereby, the hydroxyl groups are stabilized to have an aptitude of a lithium ion secondary battery. However, a separator mainly having cellulose has been used in trials of some lithium ion secondary batteries. For this reason, electrochemical stability of cellulose per se in a lithium ion secondary battery may not be a problem.

Patent Document 4 (Japanese Patent No. 4628764) also proposes a separator using cellulose nanofibers. Only cellulose fibers having a thickness of 1,000 nm or less described in Patent Document 4 are reliably obtained in accordance with a method of utilizing bacteria cellulose as described in Patent Document 4 or the like. However, a method of industrially obtaining cellulose fibers by using bacteria cellulose is not established, and a production cost is unclear. Therefore, the aforementioned method may not be an effective means for producing a sheet at a reasonable cost. In addition, Patent Document 4 also describes a means of utilizing natural cellulose. When natural cellulose is treated to uniformly have a thickness of 1,000 nm or less, fibrillation proceeds. Thereby, properties of maintaining water are increased, viscosity is greatly increased as a raw material for papermaking, and poor efficiency of dehydration is exhibited. For this reason, the aforementioned method may not be an effective means. In addition, Patent Document 4 also describes that the production can also be carried out by a casting method, but the process of forming pores is different from that in papermaking. Nevertheless, Patent Document 4 fails to clearly describe a means therefor or provide a sufficient description therefor.

In addition, papermaking is carried out by using a filter fabric or mesh in a step of forming a sheet. In accordance with this method, the filter fabric face is transferred during dehydration, and for this reason, irregularities of several micrometers are formed at the transferred face side. Therefore, when the separator is incorporated in a lithium ion secondary battery, insufficient adhesion between the separator and electrodes is exhibited, and battery performance may be degraded. Therefore, this is not preferable.

Patent Document 5 (Japanese Unexamined Patent Application, First Publication No. 2010-090486) proposes a sheet in which an oil-based compound is emulsified using fine cellulose fibers, and air resistance is controlled within a specified range. In this method, a method in which opening of pores is carried out by emulsifying the oil-based compound, but the emulsion is broken when moisture is evaporated at a drying step, and thereby, large pores having a size of 1 μm or more are non-uniformly formed in the sheet. As a result, lithium shielding properties are degraded, and short circuit caused by lithium dendrite easily occurs. For this reason, the aforementioned method cannot be used in lithium ion secondary batteries.

PRIOR ART DOCUMENTS

Patent Documents

[Patent Document 1] Japanese Unexamined Patent Application, First Publication No. H11-040130
[Patent Document 2] Japanese Patent No. 4425576
[Patent Document 3] Japanese Patent No. 4201308
[Patent Document 4] Japanese Patent No. 4628764
[Patent Document 5] Japanese Unexamined Patent Application, First Publication No. 2010-090486

SUMMARY OF THE INVENTION

Problems to be Solved by the Invention

The present invention was made considering the aforementioned circumstances, and has an objective to provide a porous membrane formed from cellulose which is suitably used as a separator for an electrochemical device, has a pore diameter by which high lithium shielding properties that cannot be exerted by non-woven fabrics, paper or the like can be realized, exhibits superior performances as a separator, and can be prepared at a reasonable cost, and in particular, has low inner resistivity.

Means for Solving the Problems

As a result of diligent studies in order to achieve the aforementioned objective, the present inventors discovered that a porous membrane formed from cellulose with specific physical properties exhibits superior performances as a separator for an electrochemical device, thus completing the present invention.

The present invention relates to a porous membrane comprising cellulose fibers,
wherein
the cellulose fibers comprise cellulose fibers with a diameter of 1 μm or more in an amount of 5% by weight or more based on the total weight of the cellulose fibers, the mode diameter (maximal frequency) of the pore distribution determined by the mercury penetration method is less than 0.3 μm,
the air resistance per thickness of 10 μm ranges from 20 to 600 seconds, and
the porous membrane has a volume resistivity of 1500 Ω·cm or less determined by alternate current with a frequency of 20 kHz in which the porous membrane is impregnated with a 1 mol/LiPF$_6$/propylene carbonate solution.

The porous membrane of the present invention preferably has a porosity ranging from 30 to 70%.

The porous membrane of the present invention preferably has the air resistance per 10 μm of a membrane thickness ranging from 30 to 250 seconds.

The porous membrane of the present invention is preferably obtained from a slurry containing the aforementioned cellulose fibers together with a hydrophilic pore former.

The solubility of the aforementioned hydrophilic pore former with respect to water is preferably 10% by weight or more.

The vapor pressure at 25° C. of the aforementioned hydrophilic pore former is preferably less than 0.1 kPa.

The water-octanol partition coefficient of the aforementioned hydrophilic pore former preferably ranges from −1.2 to 0.8.

The aforementioned hydrophilic pore former is preferably a glycol ether.

The aforementioned slurry preferably contains a hydrophilic polymer binder in an amount ranging from 3 to 80 parts by weight with respect to 100 parts by weight of the aforementioned raw material of cellulose fibers.

The present invention also relates to a separator for an electrochemical device, which comprises the aforementioned porous membrane. In addition, the present invention also relates to an electrochemical device such as a battery, a capacitor or the like, which comprises the aforementioned separator for an electrochemical device.

In addition, the present invention also relates to a process for preparing the aforementioned porous membrane formed from cellulose comprising the steps of: applying a slurry including at least a hydrophilic pore former and cellulose fibers comprising cellulose fibers with a diameter of 1 μm or more, in an amount of 5% by weight or more based on the total weight of the cellulose fibers, onto a substrate; drying the aforementioned slurry to form a sheet on the substrate; and
separating the sheet from the aforementioned substrate to obtain a cellulose porous membrane formed from the aforementioned sheet.

The process for producing a porous membrane of the present invention preferably further comprises a step of cleaning the aforementioned sheet or the porous membrane with an organic solvent.

Effects of the Invention

In the present invention, the pore size and pore amount of the porous membrane can be freely designed. For this reason, the porous membrane having high lithium shielding properties that cannot be exerted by non-woven fabrics, paper or the like, and at the same time, having a sufficient strength and a low volume resistivity can be obtained. In addition, the aforementioned porous membrane can be produced at a reasonable cost.

In addition, the separator for an electrochemical device obtained by the preparation process of the present invention exhibits superior performances as a separator and is produced at a relatively reasonable cost, as compared with conventional separators using cellulose materials.

MODES FOR CARRYING OUT THE INVENTION

The porous membrane of the present invention is a porous membrane comprising cellulose fibers,
wherein
the cellulose fibers comprise cellulose fibers with a diameter of 1 μm or more, in an amount of 5% by weight or more based on the total weight of the cellulose fibers, the mode diameter (maximal frequency) of the pore distribution determined by the mercury penetration method is less than 0.3 μm,
the air resistance per thickness of 10 μm ranges from 20 to 600 seconds, and
the porous membrane has a volume resistivity of 1500 Ω·cm or less determined by alternate current with a frequency of 20 kHz in which the porous membrane is impregnated with a 1 mol/LiPF$_6$/propylene carbonate solution.

In the present invention, usable cellulose fibers are not limited by types of cellulose such as cellulose I, cellulose II, or the like. Natural fibers of cellulose I represented by cotton, cotton linter, or wood pulp are preferable. Fibers of cellulose II represented by regenerated cellulose have a lower degree of crystallization, as compared with fibers of cellulose I, and tend to form short fibers at the time of subjecting to a fibrillation treatment. Therefore, cellulose II is not preferable.

In the present invention, cellulose fibers may be subjected to microfibrillation. An apparatus for microfibrillation treatment of cellulose fibers is not particularly limited. As examples thereof, mention may be made of, for example, a homogenizer such as a high pressure homogenizer (e.g., high pressure dispersing treatment by a Manton-Gaulin disperser), a Ranie type pressure homogenizer, an ultrahigh pressure homogenizer, Altimizer (trademark) (manufactured by Sugino Machine Co., Ltd.), a dispersion apparatus such as a bead mill or a planetary mill, a mass colloider (abrasive grain plate apparatus for grinding in which several abrasive plates provided with abrasive grains having a grain size ranging from No. 16 to No. 120 are arranged for grinding, manufactured by Masuko Sangyo Co., Ltd.) or the like. In addition, a refiner used for papermaking such as a double disk refiner or a beater can also be used for pretreatment before the microfibrillation treatment is carried out. In addition, cellulose nanofibers obtained by forming nanofibers by means of a TEMPO oxidation catalyst can also be used although the blending amount thereof may be limited.

Fibers having a diameter of 1 μm or more are contained in an amount of preferably 5% by weight or more, and more preferably 10% by weight or more, with respect to the total weight of the cellulose fibers used in the present invention. In particular, in the preparation process of the present invention described below, casting application is carried out on a substrate, and for this reason, it is difficult to prepare and use a slurry only with thin cellulose fibers having a fiber diameter of less than 1 μm which may cause an extremely high viscosity of the slurry. In addition, in order to make it applicable, the concentration of the slurry must be reduced, and thereby, a cost for drying a solvent used therefor increases. For this reason, a cost may become unreasonable. In addition, if thin cellulose fibers having a reduced fiber diameter are produced by exerting shearing force to cellulose fibers by a general method, the length of fibers also tends to be reduced. Therefore, a strength such as a tear strength of the prepared sheet may tend to be reduced. For this reason, the tear strength of the prepared sheet can be improved by means of the presence of fibers having a diameter of 1 μm or more in an amount of 5% by weight or more. As fibers other than the fibers having a diameter of 1 μm or more, thin nanofibers having a diameter of several nanometers can also be used as long as the casting application can be carried out with the viscosity in a slurry concentration of 1% by weight or more. The upper limit of the amount of the fibers having a diameter of 1 μm or more in the cellulose fibers used in the present invention is not particularly limited. For example, the aforementioned amount may be 40% by weight or less, preferably 30% by weight or less, and more preferably 20% by weight or less. If the fibers having a diameter of 1 μm or more are present in an amount exceeding the specified amount, the number of contact points of individual cellulose fibers via hydrogen bonds is reduced. For this reason, the strength of the obtained sheet may be reduced.

Cellulose fibers can be uniformly dispersed in water by virtue of hydroxyl groups which cellulose molecules have, and the viscosity of the slurry depends on the fiber length and surface area of the cellulose fibers. If cellulose fibers are thinner, the surface area of the cellulose increases, and for this reason, the viscosity of the slurry naturally increases. In addition, as the fiber length becomes longer, interaction among fibers increases. It is believed that this may also be a factor of increasing the viscosity. The increase of viscosity due to the aforementioned interactions is a factor of inhibiting formation of a sheet at a high concentration. In the case of using nanocellulose, a means for reducing a concentration is generally carried out.

In addition, cellulose fibers have a property in which fibers are hydrogen-bonded during the dehydration step by virtue of the hydroxyl groups thereof. This feature cannot be observed in non-woven fabrics prepared with synthetic fibers other than regenerated cellulose. During the aforementioned step of formation of hydrogen bonds, strength is exhibited. On the other hand, shrinkage of cellulose fibers during a drying step due to interactions among fibers is larger than that of non-woven fabrics using synthetic fibers. In particular, as the diameter of fibers becomes thinner, stiffness of the fibers reduces. For this reason, the aforementioned shrinkage is remarkably observed. In addition, it is known that in a sheet prepared using fibers in which fibrillation extremely proceeds, the fibers completely adhere, and for this reason, transparency occurs. Namely, it is difficult to control a pore diameter or produce a porous sheet only by reducing the fiber diameter (thickness). For this reason, control of shrinkage during drying and inhibition of hydrogen bonding among fibers are needed in the production of the porous sheet. Particular conventional methods propose that the raw materials subjected to a sheet formation by means of a papermaking method or a casting method are dried by replacing the solvent with a hydrophilic solvent such as acetone, and subsequently, replacing the hydrophilic solvent with a more hydrophobic solvent such as a solvent mixture of toluene and acetone. However, the aforementioned methods have two problems. The first problem is the operation of solvent replacement of water of the dispersion solvent with acetone. Cellulose fibers exhibit an increased property of maintaining water as the fiber diameter is reduced. For this reason, the replacement of water with the solvent is extremely slow work, and is a factor of reducing productivity in view of practical production. In addition, the pore diameter depends on the diameter of the fibers, and for this reason, the pore diameter is consistently controlled by the thickness of the fibers. Therefore, if uniform fibers are not utilized, the desirable pore diameter cannot be obtained. The step of treating cellulose fibers also requires cost and time.

The pore diameter of the porous membrane formed from cellulose of the present invention preferably has the mode diameter (maximal frequency) of the pore distribution determined by the mercury penetration method which is less than 0.3 μm, preferably 0.25 μm or less, and more preferably 0.2 μm or less. If the aforementioned mode diameter is 0.3 μm or more, lithium shielding properties are reduced, and risk of occurrences of short circuit due to lithium dendrite may increase. Therefore, this is not preferable in view of safety.

The pore diameter of the porous membrane formed from cellulose of the present invention preferably has the maximum value of the pore diameter measured by a mercury penetration method, which is 1.5 μm or less. The particle size of the electrode active material used in an electrochemical device such as a lithium ion battery varies. For this reason, the pore diameter does not have to be always small. In accordance with an approximate criterion, if the pore diameter is ¼ of the particle size of the electrode active material used in a battery, short circuit may not occur. On the other hand, in the case of use in an electrochemical device which uses active materials having a small particle size, the maximum value must be reduced to be less than 1.5 μm in some cases. When a particle size distribution of the sheet prepared in the present invention is measured by means of a mercury penetration method, a peak can also be identified at 1.5 μm or more. This value is caused by the irregularities of the surface of the sheet, and does not indicate the pore diameter of the porous membrane formed from cellulose.

The air resistance and porosity roughly have a correlation with resistance of the porous membranes formed from cellulose, that is, direct-current resistance and alternating-current impedance. As the air resistance becomes low and the porosity becomes high, the resistance value tends to be reduced. Therefore, output properties and cycle characteristics of the electrochemical device are improved. On the other hand, for use in lithium ion secondary batteries, it is known that lithium shielding properties are reduced, and risk of occurrences of short circuit due to lithium dendrite may increase. In the porous membrane formed from cellulose of the present invention, an air resistance per film thickness of 10 μm preferably ranges from 20 to 600 seconds (/100 cc), more preferably ranges from 20 to 450 seconds, and more preferably ranges from 30 to 250 seconds. The aforementioned air resistance can be measured based on JIS P8117. When the aforementioned air resistance is below 20 seconds, lithium shielding properties are reduced, and risk of occurrences of short circuit due to lithium dendrite may increase for use in lithium ion secondary batteries. Therefore, this is not preferable in view of safety. On the other hand, when the aforementioned air resistance exceeds 600 seconds, the volume resistivity particularly increases, and output properties of the electrochemical device may be degraded. Therefore, this is not preferable.

The air resistance has a correlation with the pore diameter and the amount of pores per unit area. For example, when an air resistance of a sheet having a double layered structure in which a layer having a pore diameter increased in the direction of thickness and having an increased amount or pores per unit area and another layer having a small pore diameter and having a reduced amount of pores are laminated is measured, the air resistance can be obtained can be obtained by the sum of the measured values of the aforementioned single layers. For this reason, if the thickness of the layer having a small pore diameter and having a reduced pore area per unit area is thin, the value of the air resistance becomes small.

The porosity of the porous membrane formed from cellulose of the present invention preferably ranges from 30% to 70%. The porous membrane formed from cellulose of the present invention maintains the porosity in the range of 30% to 70%, and thereby, the porous membrane formed from cellulose can be applied well to an electrochemical device. Even if the porosity is below 30%, the electrochemical device with the porous membrane formed from cellulose can be operated, but output reduces due to a high resistance value. Therefore, the sufficient performance as the electrochemical device may not be exhibited. On the other hand, if the porosity exceeds 70%, the mode diameter of the pore distribution increases, and resistance caused by the porous membrane formed from cellulose reduces. For this reason, output performances of the electrochemical device and cycle characteristics are improved. However, for use in lithium ion secondary batteries, lithium shielding properties are reduced, and risk of occurrences of short circuit due to lithium dendrite may increase. Therefore, this is not preferable in view of safety.

The porosity in the present invention can be calculated from the weight of the solvent absorbed in the porous membrane formed from cellulose after the porous membrane formed from cellulose is impregnated with the solvent by which the cellulose fibers are not swollen. More particularly, a sample prepared by cutting into a size of 50 mm×50 mm is moisturized for one day under an atmosphere of 23° C. and 50% relative humidity, and subsequently, a thickness of the sample is measured. In addition, the weight of the sample is also weighed by means of a scale defining a 4-digit or 5-digit number. After weighing the sample, the sample is impregnated with a solvent for one minute. Subsequently, the superfluous solvent present over the surface of the sample is removed with absorbent paper, and the weight of the sample is again weighed. A value obtained by subtracting the weight of the sample before impregnation with the solvent from the weight of the sample after impregnation with the solvent, is divided by the density of the solvent. Thereby, a volume of the solvent can be obtained. The obtained value of the volume is divided by the total volume calculated from the thickness, and then multiplied by 100(%). The obtained value defines porosity. Therefore, the porosity in this case can be obtained from the following equation:

Porosity (%)=100×((weight of sheet after impregnation with solvent)−(weight of sheet before impregnation with solvent))/((density of solvent for use in impregnation)×5×5×(thickness) (cm))

A solvent which can be used in measuring a porosity in the present invention is a solvent by which cellulose is not swollen. For this reason, an organic solvent having a low polarity is preferably used. In addition, the solvent should be selected from solvents which do not evaporate during a short period of time for the measurement. As examples of particularly preferable solvents, mention may be made of propylene glycol usually used in an electrolytic solution or a petroleum-based solvent having a high boiling point such as kerosene, and the like.

The porous membrane formed from cellulose of the present invention has a volume resistivity of 1500 Ω·cm or less determined by alternate current with a frequency of 20 kHz in which the porous membrane formed from cellulose is impregnated with a 1 mol/L solution of $LiPF_6$ dissolved in propylene carbonate. The volume resistivity correlates with the aforementioned air resistance and porosity. Basically, as an air resistance decreases and a porosity increases, a volume resistivity tends to reduce. A pore size of a porous membrane and a pore distribution in the membrane also have effects on a volume resistivity. For this reason, a porous membrane formed from cellulose with a decreased air resistance and an increased porosity does not always exhibit a low volume resistivity. Here, the alternate current with a frequency of 20 kHz is utilized in order to remove an electrochemical element such as a reaction at the electrode interface from the measurement value of the volume resistivity. Thereby, only the total of the resistance of the measurement apparatus and the ion conduction of the porous membrane formed from cellulose contributes to the measurement value. Therefore, the aforementioned measurement value can reflect the pore distribution and pore diameter of the porous membrane formed from cellulose. In particular, the aforementioned volume resistivity is preferably 1,500 Ω·cm or less, and more preferably 1,000 Ω·cm or less. When the volume resistivity exceeds 1,500 Ω·cm, the cycle characteristics may be degraded. When the volume resistivity is 1,500 Ω·cm or less, good cycle characteristics are exhibited. For this reason, such a volume resistivity can be suitable for use as a separator for an electrochemical device.

The measurement of the volume resistivity with the alternate current of 20 kHz in the present invention can be carried out in accordance with the following procedures: First, a porous membrane formed from cellulose punched in a size of 20 mm in diameter is dried for 24 hours or more at 150° C. Subsequently, five dried porous membranes formed from cellulose are placed in a stacking manner in a sample holder for solid of SH2-Z model (manufactured by Toyo Corporation), and then impregnated sufficiently with an electrolytic solution of $LiPF_6$/propylene carbonate at the concentration of 1 mol/L. In addition, preferably, after the air remaining among porous membranes formed from cellulose is deaerated under reduced pressure which is down to 0.8 MPa, the porous membranes formed from cellulose are bookended between two faced gold electrodes, and alternating current impedance (Ω) is measured by means of a frequency response analyzer VSP (manufactured by Bio-Logic) in which a potentio/galvanostat is combined under the conditions of a swept frequency ranging from 100 mHz to 1 MHz and an amplitude of 10 mV. A resistivity per unit volume (volume resistivity) is obtained from the aforementioned value and the measured thickness of the porous membrane formed from cellulose. It is preferable that only the resistance component, which the measurement apparatus has, be measured or be cancelled so as to non-reflect on the measurement results.

The surface roughness Ra of both the front and back sides of the porous membrane formed from cellulose in accordance with the present invention is preferably 1.5 or less. It is known that the surface roughness affects the alternating current impedance as contact resistance of the separator and the positive electrode at the time of preparing the electrochemical device. The aforementioned contact resistance can be calculated from the difference between an alternating current impedance value at a frequency of 0.1 Hz and an alternating current impedance value at a frequency of 20 kHz, both being measured by means of an electrochemical device such as a laminate cell or a coin battery. As the value of the surface roughness Ra increases, the difference between the alternating current impedance value at 0.1 Hz and the alternating current impedance value at 20 kHz increases. The alternating current impedance value is inversely proportional to a facing area in accordance with Ohm's law. When the facing area increases, the measured value itself reduces. For this reason, the measured value tends to be affected by the measurement errors, and the resistance components of the positive electrode and negative electrode are also included in the alternating current impedance value, as the frequency reduces. Therefore, the values cannot be assigned only by the difference of the separator. If a battery having the same electrodes, the same electrolytic solution, and the same size is used, the differences affected by the surface properties of the separators can be observed. For example, the alternating current impedance value at the Ra value of 1.5 is about 1 $\Omega$, in the case of a laminate cell having a facing area of 15 $cm^2$ prepared by using raw materials for use in a common lithium ion secondary battery, for example, a $CoLiO_2$-based positive electrode, a graphite-based negative electrode, and an electrolytic solution of $LiPF_6$. Since a contact resistance of a battery is preferably reduced, the conditions in which Ra is as small as possible are preferable. When a battery is prepared and an alternating current impedance is measured, it is preferable that the impedance be measured after 3 to 5 charge and discharge cycles are carried out at low rates and subsequently, charging is carried out up to a specified electric voltage.

The surface roughness Ra varies in accordance with the effects of the size of the raw materials, the dispersion conditions of the fibers, and the surface properties of the substrates. In particular, the surface roughness Ra is more remarkably affected by the substrate transfer face of the separator, as compared with the size of the raw materials, or the dispersion conditions of the fibers. For this reason, the aforementioned face can be suitably used at the positive electrode side. In the case of using a filter fabric or a wire mesh in a papermaking method, the wire mesh is not appropriate since the transfer face of the filter fabric appears as it is, and the Ra value cannot be controlled to a small value.

The porous membrane formed from cellulose of the present invention is preferably prepared from a slurry including a hydrophilic pore former and cellulose fibers comprising cellulose fibers with a diameter of 1 µm or more, in an amount of 5% by weight or more based on the total weight of the cellulose fibers.

In particular, the porous membrane formed from cellulose of the present invention can be obtained in accordance with a process for preparing the aforementioned porous membrane formed from cellulose comprising the steps of:

applying a slurry including at least a hydrophilic pore former and cellulose fibers comprising cellulose fibers with a diameter of 1 µm or more, in an amount of 5% by weight or more based on the total weight of the cellulose fibers, onto a substrate;

drying the aforementioned slurry to form a sheet on the substrate; and separating the sheet from the aforementioned substrate to obtain a cellulose porous membrane formed from the aforementioned sheet.

In the preparation process of the present invention, as a means for making a sheet formed from cellulose fibers porous, a slurry including a hydrophilic pore former is applied onto a substrate, followed by drying. Thereby, production efficiency can be greatly improved. In addition, in the present invention, solubility of the hydrophilic pore former with respect to water is adjusted, and thereby, a pore size of the sheet can be controlled. In addition, in the present invention, the blending amount of the hydrophilic pore former is adjusted, and thereby, porosity can be freely controlled. For example, in the present invention, the hydrophilic pore former can be used in an amount preferably ranging from 50 to 600 parts by weight, and more preferably ranging from 100 to 400 parts by weight, with respect to 100 parts by weight of the cellulose fibers.

The hydrophilic pore former used in the present invention is not particularly limited as long as it is a hydrophilic substance which can form pores in the sheet formed from cellulose fibers. The hydrophilic pore former used in the present invention has a vapor pressure at 25° C. which is preferably less than 0.1 kPa. It is known that hydrogen bonding among the fibers occurs when the moisture of the sheet ranges from 10 to 20% by weight during drying. At the time of forming the aforementioned hydrogen bonds, the pore former is present in the sheet, and the hydrogen bonding among fibers can be inhibited. Thereby, a porous sheet can be produced. In the case of using a pore former having a vapor pressure at 25° C. which is 0.1 kPa or more, the pore former evaporates during the drying step even if the blending amount thereof is increased, and sufficient formation of a porous sheet cannot be carried out. The vapor pressure at 25° C. is preferably less than 0.1 kPa, more preferably less than 0.05 kPa, and further more preferably less than 0.01 kPa. For this reason, a primary alcohol or the like having a molecular weight which is less than that of hexanol is a material having both water solubility and hydrophobic properties. Such a material easily evaporates as compared with water during the drying step, and for this reason, hydrogen bonding cannot be sufficiently inhibited. Therefore, it cannot be preferably used in the present invention. With the proviso of using a drying method under specific conditions different from the usual drying conditions, such as drying with the air filled with vapor of the pore former, or using multi-stage drying with a solvent having a lower vapor pressure than that of water, the pore former does not necessarily have a vapor pressure at 25° C. which is less than 0.1 kPa.

The hydrophilic pore former used in the present invention has a solubility with respect to water which is preferably 10% by weight or more, more preferably 20% by weight or more, and further more preferably 30% by weight or more. In the case of using a pore former having a solubility with respect to water of less than 10% by weight, the blending amount of the pore former is limited. For this reason, it may be difficult to control the desirable porosity only by the blending amount of the pore former. In addition, as drying proceeds, the amount of the solvent reduces, and thereby, the pore former which cannot be dissolved is separated. For this reason, it may be difficult to uniformly form pores in the face direction and the thickness direction of the sheet. The aforementioned hydrophobic pore former may be emulsified with an emulsifier or the like, and thereby, pores can be formed uniformly to some extent. However, it is difficult to control the pore diameter. On the other hand, in the case of using a pore former having a solubility with respect to water of 10% by weight or more, the pore former can be uniformly dispersed in the slurry, and as a high solubility with respect to water is exhibited, separation does not occur during the drying step. For this reason, by uniformly inhibiting hydrogen bonding in the drying step, pores can be uniformly produced.

The hydrophilic pore former used in the present invention has a water-octanol partition coefficient (Log Pow) preferably ranging from −1.2 to 0.8, more preferably ranging from −1.1 to 0.8, and further more preferably ranging from −0.7 to 0.4. As the aforementioned octanol, n-octanol is preferable. Among the hydrophilic pore formers, as it becomes hydrophobic, hydrogen bonding among celluloses can be inhibited with a reduced blending amount thereof, and pores can be much formed. If the aforementioned water-octanol partition coefficient exceeds 0.8, as drying proceeds, the pore formers which cannot be dissolved are separated, so that it is difficult to uniformly form pores in the face direction and in the thickness direction, the alternating-current impedance increases, and cycle characteristics of batteries are impaired. On the other hand, if the aforementioned partition coefficient is less than −1.2, an amount required for forming pores is increased, dispersibility of cellulose fibers is impaired, it is difficult to uniformly form pores in the face direction and in the thickness direction, volume resistivity increases, and cycle characteristics of batteries are impaired.

As examples of hydrophilic pore formers which can be used in the present invention, mention may be made of, for example, a higher alcohol such as 1,5-pentanediol, 1-methylamino-2,3-propanediol, or the like; a lactone such as ε-caprolactone, α-acetyl-γ-butyrolactone, or the like; a glycol such as diethylene glycol, 1,3-butylene glycol, propylene glycol, or the like; and a glycol ether such as triethylene glycol dimethyl ether, tripropylene glycol dimethyl ether, diethylene glycol monobutyl ether, triethylene glycol monomethyl ether, triethylene glycol butyl methyl ether, tetraethylene glycol dimethyl ether, diethylene glycol monoethyl ether acetate, diethylene glycol monoethyl ether, triethylene glycol monobutyl ether, tetraethylene glycol monobutyl ether, dipropylene glycol monomethyl ether, diethylene glycol monomethyl ether, diethylene glycol monoisopropyl ether, ethylene glycol monoisobutyl ether, tripropylene glycol monomethyl ether, diethylene glycol methyl ethyl ether, diethylene glycol diethyl ether or the like, as well as glycerol; propylene carbonate; N-methylpyrrolidone; or the like. Examples thereof are not limited thereto. Among these, glycol ethers have a low vapor pressure, and are the most preferable in the preparation process of the present invention.

The slurry used in the present invention preferably contains, in addition to the cellulose fibers and the hydrophilic pore former, a hydrophilic polymer binder as an adhesive for linking the fibers in an amount ranging from 3 to 80 parts by weight, and preferably ranging from 5 to 50 parts by weight with respect to 100 parts by weight of the aforementioned cellulose fibers. The hydrophilic polymer binder can exhibit a function of improving properties of dispersing cellulose, in addition to the function as an adhesive. In order to obtain a uniform pore distribution, fibers are necessary for being uniformly dispersed in the slurry. The hydrophilic polymer binder fixes to the surface of the cellulose fibers to have a role like a protective colloid. For this reason, dispersion properties are improved. If the blending amount of the binder is less than 3 parts by weight, strength of the obtained sheet may be degraded, and dispersion properties of the cellulose fibers may be impaired. For this reason, it is difficult to obtain uniform pores. On the other hand, if the amount exceeds 80 parts by weight, the binder fills in pores, and the volume resistivity of the porous membrane formed from cellulose is increased. Therefore, they are not preferable.

As the aforementioned hydrophilic polymer binder, a cellulose derivative such as methylcellulose, carboxymethylcellulose, hydroxyethylcellulose, hydroxypropylcellulose, hydroxypropylmethylcellulose, hydroxyalkylcellulose or the like; a derivative of a polysaccharide such as phosphate starch, cationated starch, corn starch or the like; or a binder such as a styrene butadiene copolymer emulsion, or polyvinylidene fluoride or the like, known as a binder for electrodes can be used.

The substrate used in the present invention is not particularly limited, and a polymer film, a glass plate, a metal plate, a peeling paper or the like can be used therefor. As the substrate, one in which the hydrophilic pore former in the slurry is not dropped from the rear face of the substrate, such as a wire, a filter fabric, a paper filter or the like is preferable. In the preparation process of the present invention, pores are formed using the hydrophilic pore former. For this reason, if the hydrophilic pore former is removed from the rear face of the substrate during the drying step, pores cannot be sufficiently formed on the sheet. In addition, the dried sheet has characteristics in that the surface property of the substrate is transferred. For this reason, the surface of the substrate is preferably as smooth as possible. Considering the aforementioned descriptions, a biaxially-drawn polyethylene terephthalate film has flexible properties, and the melting temperature thereof is relatively high. Therefore, effects of stretch or shrinkage during drying can be reduced. In addition, the biaxially-drawn polyethylene terephthalate film exhibits higher polarity, as compared with a polypropylene film. For this reason, the film is easily applied even in an aqueous slurry formulation, and can be suitably used.

In the preparation process of the present invention, as the method for applying the slurry containing the cellulose fibers and the hydrophilic pore former onto the substrate, any means can be used as long as the slurry can be uniformly applied so that the film thickness of the applied layer is within a specified range. For example, the application can be carried out in a pre-metered coater such as a slot die coater, a curtain coater, or the like, or even in an after-metered coater such as an MB coater, an MB reverse coater, a comma coater, or the like.

In the present invention, a surfactant can be added to the slurry as an additive, if necessary. A nonionic surfactant represented by acetylene glycol as a defoamer or a leveling agent can be used in an amount which has no effects on the properties of electrochemical devices. No use of ionic surfactants is preferable since ionic surfactants may affect properties of electrochemical devices.

In the slurry containing the cellulose fibers and the hydrophilic pore former, a loading material can be contained in addition to the aforementioned binder and the aforementioned surfactant. For example, an inorganic loading material such as silica particles or alumina particles, an organic loading material such as silicone powders and the like can be used. These particles can be added in an amount which has no effects on the pores of the porous membrane formed from cellulose. Use of the particles having an average particle size of less than 2 μm is preferable. If the average particle size is 2 μm or more, pores with a large pore diameter are formed by interspace among the particles, and for this reason, this is not preferable. The aforementioned loading materials have effects of reducing the viscosity of the slurry. For this reason, a concentration of the coating material can be increased, and this is suitable for increasing production efficiency. On the other hand, if an excessive amount thereof is used, strength is reduced. For this reason, a blending amount thereof which is more than 100 parts by weight with respect to 100 parts by weight of the cellulose fibers is not preferable.

The solvent of the slurry used in the present invention basically needs use of water. For the purpose of improving drying efficiency, a solvent having a higher vapor pressure than that of water, such as an alcohol such as methanol, ethanol or t-butyl alcohol, a ketone such as acetone or methyl ethyl ketone, an ether such as diethyl ether or ethyl methyl ether or the like can be added in an amount of up to 50% by weight of the total amount of the solvent. If the aforementioned solvents are added in an amount of 50% by weight or more, dispersing properties of the cellulose fibers are impaired, and uniformity of pore distribution is impaired. For this reason, this is not preferable.

In the preparation process of the present invention, the aforementioned slurry applied onto the substrate can be dried to obtain a sheet. The drying method is not particularly limited. In particular, a drying method which is commonly used, such as any one or both of drying with hot air and drying with far-infrared radiation, can be used. For example, the temperature of hot air can range from 30° C. to 150° C., and preferably range from 60° C. to 120° C. It is necessary to adjust the temperature of hot air, the amount of hot air, radiation conditions of far-infrared radiation or the like so that the structure in the thickness direction of the sheet is dried as uniformly as possible, under the conditions of the temperature of hot air, the amount of hot air, and the temperature of far-infrared radiation. In addition, in order to improve a drying efficiency, microwave heating can also be used.

The thickness of the sheet in the present invention preferably ranges from 10 to 40 μm. The thickness of the porous membrane formed from cellulose is a factor which can largely change performance of the electrochemical device. If the thickness is below 10 μm, sufficient lithium shielding properties cannot be exhibited, and safety may be insufficient. On the other hand, if the thickness exceeds 40 μm, the volume resistivity of the porous membrane formed from cellulose is increased, and the output performance of the electrochemical device may be degraded. For this reason, they are not preferable. A sheet having a thickness ranging from 15 to 30 μm is particularly preferable in view of balance between lithium shielding properties and a value of volume resistivity.

In the preparation process of the present invention, the sheet formed onto the substrate as described above is separated, and thereby, a porous membrane formed from cellulose, which is formed from the aforementioned sheet, can be obtained. A method of separating a porous membrane formed from a substrate is not particularly limited.

The preparation process of the present invention can further have a step of cleaning the aforementioned sheet with an organic solvent, in addition to the steps of applying a slurry including at least a hydrophilic pore former and cellulose fibers comprising cellulose fibers with a diameter of 1 μm or more, in an amount of 5% by weight or more based on the total weight of the cellulose fibers, onto a substrate; drying the aforementioned slurry to form a sheet on the substrate; and separating the sheet from the aforementioned substrate to obtain a cellulose porous membrane formed from the aforementioned sheet. The aforementioned cleaning step is carried out in order to remove components inhibiting performances of the electrochemical device in the case of using a surfactant, if necessary, and smoothly carry out separating the aforementioned sheet from the substrate. The organic solvent is not limited as long as the organic solvent can be used in the cleaning step. A hydrophobic solvent with a reduced solubility with respect to water is preferable in order to avoid effects of shrinkage of the sheet due to movement of the residual moisture in the organic solvent.

With respect to the aforementioned organic solvent, for example, one or two or more types of organic solvents having a relatively high evaporating rate such as acetone, methyl ethyl ketone, ethyl acetate, n-hexane, toluene, or propanol can be used once or in several divided applications. The usage manner of the organic solvent is not limited thereto. For the purpose of removing the residual pore former, a solvent with high compatibility with water, such as ethanol or methanol is preferable. However, moisture in the sheet moves to the solvent or moisture in the air absorbs to affect physical properties of the porous membrane formed from cellulose or the form of the sheet. For this reason, such a solvent must be used under the conditions in which the moisture amount is controlled. A solvent which is highly hydrophobic such as n-hexane or toluene exhibits poor effects of cleaning the hydrophilic pore former, but it is difficult to absorb moisture. For this reason, such a solvent can be preferably used. From the reasons described above, for example, a method in which cleaning is carried out successively with some solvents, for example, acetone, toluene, and n-hexane in order of gradually increasing the hydrophobic properties of the solvents, and the successive cleaning is repeated to replace the solvent, is preferable.

The porous membrane formed from cellulose of the present invention can be used as one constitutional element of a separator for an electrochemical device, or can be used as it is, as a separator for an electrochemical device.

The separator for an electrochemical device of the present invention can be used in, for example, a battery such as a lithium ion secondary battery or a polymer lithium battery, as well as a capacitor such as an aluminum electrolytic capacitor, an electrical double-layered capacitor, or a lithium ion capacitor.

The constitution of the aforementioned electrochemical device can be exactly the same as that of a conventional electrochemical device, with the exception of using the aforementioned separator for an electrochemical device of the present invention as a separator. The cell structure of the electrochemical device is not particularly limited. As examples thereof, mention may be made of a laminate type, a cylinder type, a square type, a coin type and the like.

For example, a lithium ion secondary battery as the electrochemical device comprising the separator of the present invention has a positive electrode and a negative electrode, between which the aforementioned separator for an electrochemical device is arranged, and the aforementioned separator for an electrochemical device is impregnated with an electrolytic solution.

The aforementioned positive electrode and negative electrode contain electrode active materials. As a positive electrode active material, a conventionally known one can be used. As examples thereof, mention may be made of, for example, a lithium transition metal oxide such as $LiCoO_2$, $LiNiO_2$, or $LiMn_2O_4$; a lithium metal phosphate such as $LiFePO_4$; and the like. As a negative electrode active material, a conventionally known one can be used. As examples thereof, mention may be made of, for example, a carbon material such as graphite; a lithium alloy; and the like. In addition, conventionally known conductive auxiliary materials or binders can be added in the electrodes, if necessary.

For the preparation of a lithium ion secondary battery, first, a positive electrode mixture containing a positive electrode active material and, if necessary, a conventionally known conductive auxiliary material and/or a conventionally known conductive binder, and a negative electrode mixture containing a negative electrode active material and, if necessary, a conventionally known conductive auxiliary material and/or a conventionally known conductive binder, are independently applied on conventionally known collectors. For the collector of the positive electrode, for example, aluminum or the like is used, and for the collector of the negative electrode, copper, nickel, or the like is used. After the positive electrode mixture and the negative electrode mixture are applied onto the collectors, they are dried and subjected to pressure forming. Thereby, a positive electrode in which an active material layer is formed on the collector, and a negative electrode in which an active material layer is formed on the collector can be obtained.

Subsequently, the obtained positive electrode and negative electrode and the separator for an electrochemical device of the present invention are laminated or wound in order of the positive electrode, the separator for an electrochemical device, and the negative electrode to construct a device. Subsequently, the aforementioned device is housed in an exterior material, the collectors are connected to external electrodes, and are impregnated with a conventionally known electrolytic solution. Subsequently, the exterior material is sealed. Thereby, a lithium ion secondary battery can be obtained.

In addition, an electrical double-layered capacitor as the electrochemical device comprising the separator of the present invention has a positive electrode and a negative electrode, between which the separator for an electrochemical device of the present invention is arranged, and the aforementioned separator for an electrochemical device is impregnated with an electrolytic solution.

The electrodes of the aforementioned positive electrode and negative electrode can be obtained by, for example, applying an electrode mixture containing activated carbon powder and a conventionally known conductive auxiliary material and/or conventionally known conductive binder onto a conventionally known collector, drying and subjecting to pressure forming. As the collector, for example, aluminum or the like is used.

The electrical double-layered capacitor can be obtained as follows: the positive electrode and negative electrode and the separator for an electrochemical device of the present invention are laminated or wound in order of the positive electrode, the separator for an electrochemical device, and the negative electrode to construct a device. Subsequently, the aforementioned device is housed in an exterior material, and the collectors are connected to external electrodes, and are impregnated with a conventionally known electrolytic solution. Subsequently, the exterior material is sealed.

EXAMPLES

Hereinafter, the present invention is described in detail with reference to Examples and Comparative Examples. It should be understood that the scope of the present invention is not limited to these Examples.
(1) Measurement of Fiber Length
The number average fiber length was measured by means of a fiber length-measuring machine, FIBER TESTER (manufactured by L & W).

(2) Measurement of a Rate in which the Fibers Having a Diameter of 1 µm or More are Included
The following calculation method was used. The X ray diffraction data obtained by using an X ray CT analyzer was set to the threshold level in which a diameter of 1 µm or more could be observed. The fiber parts were extracted, and a fiber amount was calculated from a rate thereof contained in the total amount. The sample was cut into a size of about 1 mm width. The cut sample with a size of about 1 mm width was fixed by a sample-holding jig, and was subjected to a CT scanning by means of TDM 1000H-Sµ. Measurement of the fiber amount was carried out by extracting any range of 27.89 µm×448.70 µm×432.26 µm at the central part in order to contain no air parts of the outer periphery of the sample.
(3) Measurement of Porosity
A sample prepared by cutting a porous membrane into a size of 50 mm×50 mm was moisturized for one day under an atmosphere of 23° C. and 50% relative humidity, and subsequently, a thickness of the sample was measured and a weight of the sample was weighed by means of a scale defining a 4-digit or 5-digit number. After weighing the sample, the sample was impregnated with kerosene for one minute. Subsequently, the superfluous solvent present over the surface of the sample was removed with absorbent paper, and the weight of the sample was again weighed. The porosity was calculated by the aforementioned equation.
(4) Measurement of Mode Diameter (Maximal Frequency) of Pore Distribution by Means of a Mercury Penetration Method
A pore distribution curve was measured by means of Autopore IV 9510 model (manufactured by Micromeritics Instrument Corporation) under the conditions of a measuring range of $\phi$ 415 to 0.0003 µm, a mercury contact angle of 130 degrees, and a mercury surface tension of 485 dynes/cm. The pore size at the maximal frequency was determined from the obtained pore distribution curve, and was used as the mode diameter.
(5) Measurement of Thickness
The thickness of the porous membrane sample with a size of 50 mm×50 mm was measured at any 5 points by means of a thickness indicator TM600 (manufactured by Kumagai Riki Kogyo Co., Ltd.). An average value obtained from the aforementioned 5 values of thickness measured was used as a membrane thickness.
(6) Measurement of Alternating Current Impedance at Frequency of 20 kHz and Determination of Volume Resistivity
A sample holder for solid of SH2-Z model (manufactured by Toyo Corporation) was used as a cell for measuring impedance. A separator punched in a size of a 20 mm diameter was dried for 24 hours or more under the condition of 150° C. Subsequently, five dried separators were placed therein in a stacking manner, and then impregnated sufficiently with a 1 mol/L electrolytic solution of $LiPF_6$/propylene carbonate. After the air remaining among separators was deaerated under reduced pressure which was down to 0.8 MPa, the separators were bookended between two faced gold electrodes, and an alternating current impedance ($\Omega$) was measured by means of a frequency response analyzer VSP (manufactured by Bio-Logic) in which a potentio/galvanostat was combined under the conditions of a swept frequency ranging from 100 mHz to 1 MHz and an amplitude of 10 mV. The measurement temperature was 25° C. A resistivity (volume resistivity) per unit volume was obtained from the aforementioned value and the thickness measured in the aforementioned (5).
(7) Measurement of Air Resistance
The air resistance (unit: seconds/100 cc) was measured by means of a method in accordance with JIS P8117.

(8) Evaluation of Lithium Shielding Properties

A laminate type of lithium ion secondary battery having a facing area of 15 cm² was prepared by using a LiCoO₂ positive electrode and an MCMB negative electrode as electrodes, and using a 1M-LiPF₆/ethylene carbonate:methyl ethyl carbonate=3:7 (volume ratio) as an electrolytic solution. In the obtained battery, charging was carried out while monitoring the electric voltage at a rate of 0.2 C up to 250% of an index of charging time. In the case of confirming the voltage drop at 5 V or more, this was determined as being non-acceptable, and in the case of confirming no voltage drop, this was determined as being acceptable.

(9) Cycle Test

A laminate type of lithium ion secondary battery having a facing area of 2.8 cm² was prepared by using a LiCoO₂ positive electrode and an MCMB negative electrode as electrodes, and using a 1M-LiPF₆/ethylene carbonate:methyl ethyl carbonate=3:7 (volume ratio) as an electrolytic solution. In the obtained battery, CC-CV charging was carried out by constant-voltage charging when reaching 4.2 V at a rate of 0.2 C. Discharging was carried out up to 3 V at a rate of 0.2 C. In the case of charge-discharge efficiency at the third cycle being less than 98.5%, this was determined as being non-acceptable, and in the case of charge-discharge efficiency at the third cycle being 98.5% or more, this was determined as being acceptable.

(10) Measurement of Tear Strength

The tear strength was measured by means of a Trouser tear method in accordance with JIS K7128-1.

Example 1

NBKP was dispersed in ion-exchanged water so as to have a concentration of 3% by weight. The dispersion was subjected to a refining treatment by cycling under the conditions so that the number average fiber length ranged from 1.0 to 1.2 mm, by means of a double disk refiner. The dispersion of the cellulose fibers in which the number average fiber length ranged from 1.0 mm to 1.2 mm was treated three times by means of a mass colloider (manufactured by Masuko Sangyo Co., Ltd.). Thereby, a raw material 1 of cellulose fibers having a number average fiber length ranging from 0.3 to 0.4 mm was obtained. In the same manner as described above, a raw material 2 of cellulose fibers having a number average fiber length ranging from 0.7 to 0.8 mm was obtained by treating with a mass colloider once. The aforementioned raw materials 1 and 2 of cellulose fibers were independently subjected to a treatment using a dehydration apparatus to have a concentration of about 5% by weight.

A raw material was prepared by mixing the aforementioned raw material 1 of cellulose fibers in an amount of 90% by weight as a solid content thereof and the aforementioned raw material 2 of cellulose fibers in an amount of 10% by weight as a solid content thereof, with respect to the total amount of the cellulose fibers. With respect to 100 parts by weight of the aforementioned raw material, 250 parts by weight of a glycol ether-based pore former (product name: Hisolve MTEM, manufactured by TOHO Chemical Industry Co., Ltd.), and 15 parts by weight of carboxymethylcellulose (product name: SUNROSE MAC-500 LC, manufactured by Nippon Paper Industries Co., Ltd. Chemical Division) dissolved in ion-exchanged water to have a concentration of 1% by weight as a binder, were added, and water was added thereto so that a concentration of the solid content of the mixture was finally 1.8% by weight. Thereby, a coating material was prepared. The coating material was subjected to a dispersion treatment by means of a homomixer (manufactured by AS ONE Corporation) until the mixture was uniformly mixed.

The prepared coating material was applied onto a PET film having a thickness of 125 µm by means of an applicator so that a WET sheet thickness was 1.0 mm, and subsequently, dried for 12 minutes by means of hot air at 120° C. and an infrared heater. The obtained coating membrane was separated from the PET film in toluene, and subsequently, toluene was evaporated therefrom. Thereby, a porous membrane formed from cellulose having a membrane thickness of 28 µm and having porosity of 45% was obtained.

Example 2

Figure 1:
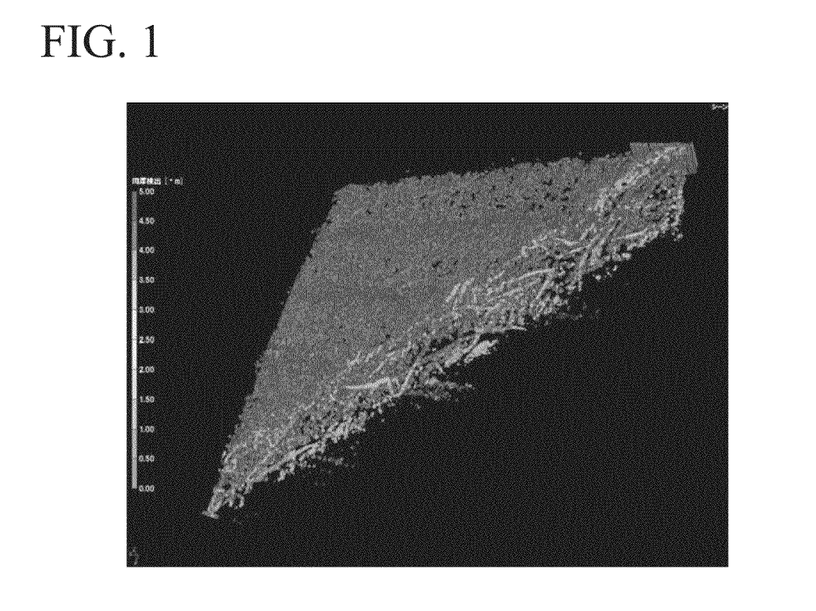
FIG. 1 X ray CT analytical photograph of a separator of Example 2.
Figure 2:
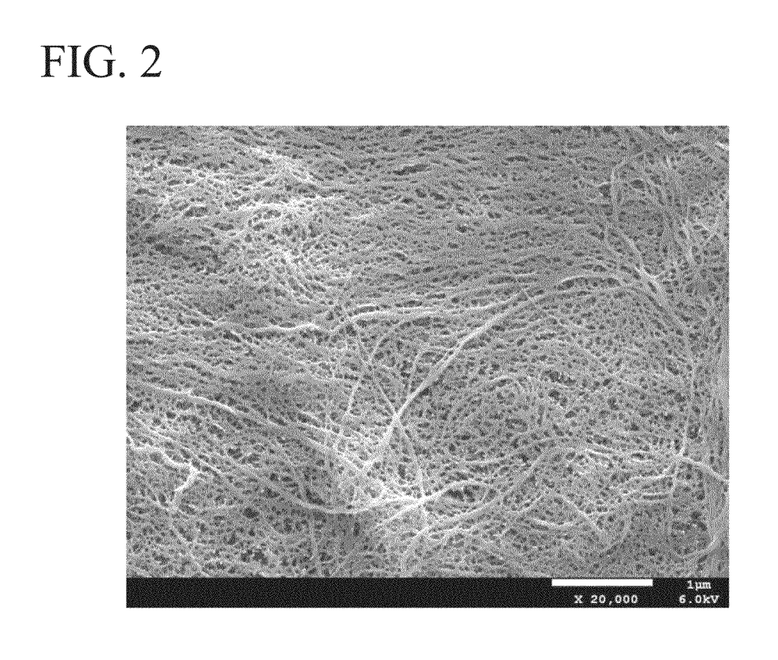
FIG. 2 Magnified photograph of a surface of a separator of Example 2.
Figure 3:
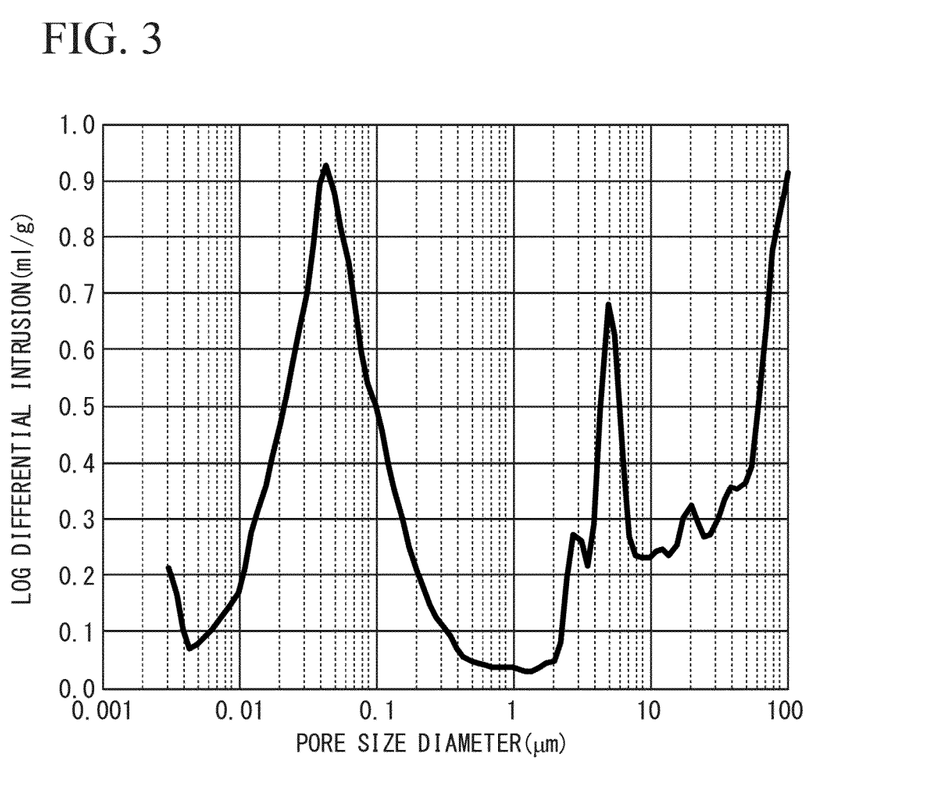
FIG. 3 Graph showing results of measuring pore distribution in accordance with a mercury penetration method.

A porous membrane formed from cellulose having a membrane thickness of 28 µm and porosity of 45% was obtained in the same manner as that of Example 1, with the exception of replacing the aforementioned glycol ether-based pore former with another glycol ether-based pore former (product name: Hisolve DB, manufactured by TOHO Chemical Industry Co., Ltd.) and adding it in an amount of 150 parts by weight. An X ray CT analytical photograph of the separator (porous membrane) obtained by Example 2 is shown in FIG. 1, a magnified photograph, FE-SEM photograph, of the surface of the separator (porous membrane) of Example 2 is shown in FIG. 2, and the results of measuring pore distribution in accordance with a mercury penetration method are shown in FIG. 3.

Example 3

A porous membrane formed from cellulose having a membrane thickness of 26 µm and porosity of 43% was obtained in the same manner as that of Example 2, with the exception of replacing the aforementioned glycol ether-based pore former with propylene carbonate.

Example 4

A porous membrane formed from cellulose having a membrane thickness of 26 µm and porosity of 36% was obtained in the same manner as that of Example 2, with the exception of replacing the aforementioned glycol ether-based pore former with another glycol ether-based pore former (product name: Hisolve B™, manufactured by TOHO Chemical Industry Co., Ltd.) and adding it in an amount of 150 parts by weight.

Example 5

A porous membrane formed from cellulose having a membrane thickness of 26 µm and porosity of 67% was obtained in the same manner as that of Example 2, with the exception of changing the adding amount of the aforementioned glycol ether-based pore former from 150 parts by weight to 350 parts by weight, and forming the WET membrane thickness of 0.8 mm.

Comparative Example 1

A porous membrane formed from cellulose having a membrane thickness of 18 µm and porosity of 26% was obtained in the same manner as that of Example 1, with the exception of replacing the aforementioned glycol ether-based pore former with another glycol ether-based pore former (product name: Himol™, manufactured by TOHO Chemical Industry Co., Ltd.) in an amount of 1,000 parts by weight, and forming the WET membrane thickness of 0.6 mm.

Comparative Example 2

A cellulose membrane having a membrane thickness of 17 μm and porosity of 2% was obtained in the same manner as that of Example 1, with the exception of replacing the aforementioned glycol ether-based pore former with another glycol ether-based pore former (product name: Hisolve MDPOM, manufactured by TOHO Chemical Industry Co., Ltd.) in an amount of 300 parts by weight.

Comparative Example 3

A porous membrane formed from cellulose having a membrane thickness of 24 μm and porosity of 36% was obtained in the same manner as that of Example 2, with the exception of replacing the aforementioned glycol ether-based pore former with another glycol ether-based pore former (product name: Hisolve BDM, manufactured by TOHO Chemical Industry Co., Ltd.) in an amount of 200 parts by weight.

Comparative Example 4

A porous membrane formed from cellulose having a membrane thickness of 20 μm and porosity of 26% was obtained in the same manner as that of Example 1, with the exception of replacing the blending amount of propylene carbonate with 80 parts by weight.

Comparative Example 5

A porous membrane formed from cellulose having a membrane thickness of 20 μm and porosity of 72% was obtained in the same manner as that of Example 2, with the exception of replacing the blending amount of the aforementioned glycol ether-based pore former (product name: Hisolve DB, manufactured by TOHO Chemical Industry Co., Ltd.) with 450 parts by weight, and forming the WET membrane thickness of 0.6 mm.

Comparative Example 6

A porous membrane formed from cellulose having a membrane thickness of 20 μm and porosity of 50% was obtained in the same manner as that of Example 1, with the exception of replacing the aforementioned glycol ether-based pore former with tridecane in an amount of 200 parts by weight, further adding a surfactant (product name: Tween 80, manufactured by Kanto Chemical Co., Inc.) in an amount of 0.1% with respect to the total weight, and forming the WET membrane thickness of 0.8 mm.

Comparative Example 7

NBKP was dispersed in ion-exchanged water so as to have a concentration of 3% by weight. The dispersion was subjected to a refining treatment by cycling under the conditions so that the number average fiber length ranged from 0.8 to 1.0 mm, by means of a double disk refiner. The dispersion of the cellulose fibers in which the number average fiber length ranged from 0.8 to 1.0 mm was treated ten times by means of a mass colloider (manufactured by Masuko Sangyo Co., Ltd.). Thereby, a raw material 3 of cellulose fibers having a number average fiber length of 0.1 mm was obtained. The obtained raw material was subjected to a treatment using a dehydration apparatus to have a concentration of about 5% by weight. A porous membrane formed from cellulose having a membrane thickness of 27 μm and porosity of 44% was obtained in the same manner as that of Example 2, with the exception of using the aforementioned raw material 3 and using the concentration of the solid content of the coating material of 1.0% by weight.

The vapor pressure, solubility, and water-octanol partition coefficient of each of the pore formers used in Examples 1 to 5 and Comparative Examples 1 to 7 are shown in Table 1.

TABLE 1

|  | Vapor pressure (kPa) | Solubility (%) | Partition coefficient |
|---|---|---|---|
| Example 1 | <0.01 | ∞ | −1.03 |
| Example 2 | <0.01 | ∞ | 0.29 |
| Example 3 | 0.02 | 20 | 0.08 |
| Example 4 | <0.01 | ∞ | 0.72 |
| Example 5 | <0.01 | ∞ | 0.29 |
| Comparative Example 1 | <0.01 | ∞ | −1.46 |
| Comparative Example 2 | 0.18 | ∞ | 0.50 |
| Comparative Example 3 | 0.02 | 9 | 0.99 |
| Comparative Example 4 | 0.02 | 20 | 0.08 |
| Comparative Example 5 | <0.01 | ∞ | 0.29 |
| Comparative Example 6 | <0.01 | <0.01 | 6.73 |
| Comparative Example 7 | <0.01 | ∞ | 0.29 |

Physical properties of the sheets formed from cellulose prepared in Examples 1 to 5 and Comparative Examples 1 to 6 are shown in Table 2.

TABLE 2

|  | Weight (g/m²) | Thickness (μm) | Porosity (%) | Rate of thick fibers (%) | Mode diameter (μm) | Air resistance (seconds) | Volume resistivity (Ω·cm) | Overcharge test | Cycle test |
|---|---|---|---|---|---|---|---|---|---|
| Example 1 | 11.2 | 28 | 45 | 5 | 0.05 | 150 | 960 | ○ | ○ |
| Example 2 | 11.4 | 28 | 45 | 5 | 0.06 | 120 | 760 | ○ | ○ |
| Example 3 | 11.0 | 26 | 43 | 5 | 0.08 | 132 | 820 | ○ | ○ |
| Example 4 | 11.5 | 26 | 36 | 5 | 0.06 | 233 | 1320 | ○ | ○ |
| Example 5 | 10.0 | 26 | 67 | 5 | 0.25 | 48 | 330 | ○ | ○ |
| Comparative Example 1 | 7.8 | 18 | 26 | 5 | 0.09 | 361 | 1950 | ○ | x |
| Comparative Example 2 | 12.0 | 17 | 2 | 5 | — | N.A. | N.A. | ○ | N.A. |

TABLE 2-continued

|  | Weight (g/m²) | Thickness (μm) | Porosity (%) | Rate of thick fibers (%) | Mode diameter (μm) | Air resistance (seconds) | Volume resistivity (Ω·cm) | Over-charge test | Cycle test |
|---|---|---|---|---|---|---|---|---|---|
| Comparative Example 3 | 10.5 | 24 | 36 | 5 | 0.08 | 618 | 2320 | ○ | x |
| Comparative Example 4 | 11.1 | 20 | 26 | 5 | 0.03 | 783 | 1650 | ○ | x |
| Comparative Example 5 | 7.1 | 20 | 72 | 5 | 0.35 | 15 | 250 | x | ○ |
| Comparative Example 6 | 9.5 | 20 | 50 | 5 | 0.38 | 76 | 2360 | x | x |

*N.A.: immeasurable

Physical properties of the porous membranes prepared in Example 2 and Comparative Example 7 are shown in Table 3.

TABLE 3

|  | Weight (g/m²) | Thickness (μm) | Porosity (%) | Rate of thick fibers (%) | Tear strength (kN/m) |
|---|---|---|---|---|---|
| Example 2 | 11.2 | 28 | 45 | 5 | 0.66 |
| Comparative Example 7 | 12.0 | 24 | 44 | 0 | 0.34 |

From the results shown in Examples 1 to 5, it can be seen that the porous membranes formed from cellulose of the present invention have low volume resistivity which is 1500 Ω·cm or less, and can be suitably used as a separator of an electrochemical device.

On the other hand, in Comparative Example 1, the porosity of the obtained sheet is low, and for this reason, the volume resistivity is 1950 Ω·cm, which is high. In addition, poor cycle characteristics are exhibited, and for this reason, the obtained porous membrane is not preferably used as a separator for an electrochemical device.

In Comparative Example 2, the pore former having a vapor pressure of 0.18 kPa is used, and for this reason, the cellulose membrane having few pores, which is not preferable as a separator for an electrochemical device is obtained. In Comparative Example 3, the pore former having a water-octanol partition coefficient exceeding 0.8 is used, and for this reason, the obtained porous membrane formed from cellulose has the excessively increased air resistance, the increased volume resistivity, and the poor cycle characteristics. Therefore, the obtained porous membrane is not preferable as a separator for an electrochemical device.

In Comparative Example 4, the obtained porous membrane formed from cellulose has the porosity of less than 30%, the excessively increased air resistance, the increased volume resistivity, and poor cycle characteristics. For this reason, the obtained porous membrane is not preferable as a separator for an electrochemical device.

In Comparative Example 5, the obtained porous membrane formed from cellulose has the porosity of 72%, and for this reason, the air resistance is excessively reduced. In addition, the mode diameter is increased, and for this reason, the obtained porous membrane is non-acceptable in view of the evaluation of lithium shielding properties. Therefore, the obtained porous membrane is not preferable for use as a separator for an electrochemical device, and in particular, for use as a lithium ion secondary battery.

In Comparative Example 6, the hydrophobic pore former having a water/octanol partition coefficient exceeding 0.8 is emulsified with the surfactant and then used. For this reason, the porous membrane formed from cellulose has the increased mode diameter, is non-acceptable in view of the evaluation of lithium shielding properties. In addition, the volume resistivity is high, and the poor cycle characteristics are exhibited. For this reason, the obtained porous membrane is not preferable for use as a separator for an electrochemical device, and in particular, for use as a lithium ion secondary battery.

When Example 2 is compared with Comparative Example 7, in Comparative Example 7, by virtue of containing no fibers of a thickness of 1 μm or more, the decreased tear strength is exhibited, and poor handling properties are exhibited.

As an example of an electrochemical device, the performances of a lithium ion secondary battery were verified.

Example 6

Preparation of a Lithium Ion Secondary Battery

A positive electrode was prepared by preparing a combination obtained by mixing $LiCoO_2$, acetylene black and a Pvdf-NMP solution (polyvinylidene fluoride-N-methylpyrrolidone) in a mass ratio of solid contents of 89:6:5, applying the combination onto an aluminum foil and drying it, casting it under pressure, and subsequently subjecting it to a heat treatment. A negative electrode was prepared by preparing a combination obtained by mixing mesocarbon microbead graphite, acetylene black, and a Pvdf-NMP solution in a mass ratio of solid contents of 90:5:5, applying the combination onto a copper foil and drying it, casting it under pressure, and subsequently subjecting it to a heat treatment.

A lithium ion secondary battery (cell size: 30×50 mm, capacity: 180 mAh) was prepared by using the porous membrane formed from cellulose obtained in Example 2 as a separator, interposing the aforementioned separator between a negative electrode and a positive electrode to form a group of electrodes, and loading an aluminum pack with the aforementioned group of electrodes and a 1 mol/L non-aqueous electrolytic solution obtained by dissolving $LiPF_6$ in a solvent mixture obtained by mixing ethylene carbonate and diethyl carbonate in a volume ratio of 3:7.

Evaluation of Lithium Ion Secondary Battery

With respect to the lithium ion secondary battery prepared in Example 6, the inner resistivity of the battery was evaluated by the measurement of alternating current impedance. The alternating current impedance (Ω) was measured using a frequency response analyzer 1260 model (manufactured by Solartron Metrology) under the conditions of swept frequency ranging from 10 mHz to 500 kHz and amplitude of 5 mV A Cole-Cole plot was prepared from the aforementioned measurement values, and a value of a real part was read when a value of an imaginary part was 0. The read value was used as an inner resistivity (Ω). The inner resistivity was 0.177 Ω.

Comparative Example 8

A lithium ion secondary battery was prepared in the same manner as that of Example 6, with the exception of using the porous membrane formed from cellulose of Comparative Example 6. The aforementioned measurement of alternating current impedance was carried out. As a result, the inner resistivity was 0.944 Ω.

As an example of the electrochemical device other than the lithium ion secondary battery, the performances of an electrical double-layered capacitor were verified.

Example 7

Preparation of Electrical Double-Layered Capacitor

An electrode was prepared by preparing a combination obtained by mixing a mixture of activated carbon, acetylene black and tetrafluoroethylene in a mass ratio of the solid content of 10:1:1, applying the combination onto an aluminum foil and drying it, casting it under pressure, and subsequently subjecting it to a heat treatment.

The porous membrane formed from cellulose obtained in Example 5 was used as a separator, and the separator was cut into a size which was larger by about 0.5 mm than the size of the electrode. The electrode was formed so as to have the facing area of 15 cm². The separator was interposed between two electrodes, and a 1 mol/L solution of tetraethylammonium $BF_4$ salt (organic electrolyte) in propylene carbonate was filled therein. Thereby, an electrical double-layered capacitor was prepared.

Evaluation of Electrical Double-Layered Capacitor

The performances of the electrical double-layered capacitor prepared in Example 7 were evaluated. The inner resistivity of the battery was evaluated by the measurement of alternating current impedance. The alternating current impedance (Ω) was measured using a frequency response analyzer 1260 model (manufactured by Solartron Metrology) under the conditions of swept frequency ranging from 10 mHz to 500 kHz and amplitude of 5 mV. A Cole-Cole plot was prepared from the aforementioned measurement values, and a value of a real part was read when a value of an imaginary part was 0. The read value was used as an inner resistivity (Ω). The inner resistivity was 0.117 Ω.

Comparative Example 9

An electrical double-layered capacitor was prepared in the same manner as that of Example 7, with the exception of using the porous membrane formed from cellulose prepared in Comparative Example 6, and the inner resistivity was evaluated. As a result, the inner resistivity of the electrical double-layered capacitor was 0.829 Ω.

As described above, from the results of Example 6 and Comparative Example 8, it can be seen that the battery equipped with the porous membrane formed from cellulose of the present invention has a reduced inner resistivity, and can be suitably used as a battery. In addition, from the results of Example 7 and Comparative Example 9, it can be seen that the capacitor equipped with the porous membrane formed from cellulose of the present invention has a reduced inner resistivity, and can be suitably used as a capacitor.

The invention claimed is:

1. A porous membrane comprising cellulose fibers, wherein
    said cellulose fibers comprise cellulose fibers with a diameter of 1 μm or more in an amount of 5% by weight or more based on the total weight of said cellulose fibers,
    a mode diameter (maximal frequency) of a pore distribution determined by a mercury penetration method is less than 0.3 μm,
    an air resistance per thickness of 10 μm ranges from 20 to 600 seconds, and
    said porous membrane has a volume resistivity of 1500 Ω·cm or less determined by alternate current with a frequency of 20 kHz in which said porous membrane is impregnated with a 1 mol/$LiPF_6$/propylene carbonate solution.

2. The porous membrane according to claim 1, which has a porosity ranging from 30 to 70%.

3. The porous membrane according to claim 1, which has an air resistance per thickness of 10 μm ranging from 30 seconds to 250 seconds.

4. The porous membrane according to claim 1, which is obtained from a slurry containing a hydrophilic pore former together with said cellulose fibers.

5. The porous membrane according to claim 4, wherein said hydrophilic pore former has a solubility with respect to water of 10% by weight or more.

6. The porous membrane according to claim 4, wherein said hydrophilic pore former has a vapor pressure at 25° C. which is less than 0.1 kPa.

7. The porous membrane according to claim 4, wherein a water-octanol partition coefficient of said hydrophilic pore former ranges from −1.2 to 0.8.

8. The porous membrane according to claim 4, wherein said hydrophilic pore former is a glycol ether.

9. The porous membrane according to claim 4, wherein said slurry contains a hydrophilic polymer binder in an amount ranging from 3 to 80 parts by weight with respect to 100 parts by weight of said cellulose fibers.

10. A separator for an electrochemical device comprising the porous membrane as recited in claim 1.

11. An electrochemical device comprising the separator for an electrochemical device as recited in claim 10.

12. The electrochemical device according to claim 11, which is a battery or a capacitor.

13. A process for preparing a porous membrane formed from cellulose comprising the steps of:
    applying a slurry including at least a hydrophilic pore former and cellulose fibers comprising cellulose fibers with a diameter of 1 μm or more, in an amount of 5% by weight or more based on the total weight of said cellulose fibers, onto a substrate;
    drying said slurry to form a sheet on said substrate; and
    separating said sheet from said substrate to obtain a cellulose porous membrane formed from said sheet.

14. The process for preparing a porous membrane according to claim 13, further comprising a step of cleaning said sheet or said porous membrane with an organic solvent.

* * * * *